US006300461B1

(12) United States Patent
Braat et al.

(10) Patent No.: US 6,300,461 B1
(45) Date of Patent: Oct. 9, 2001

(54) PROCESS FOR THE MANUFACTURE OF LOW MOLECULAR WEIGHT POLYPHENYLENE ETHER RESINS

(75) Inventors: Adrianus J. F. M. Braat, Roosendaal (NL); Hugh Ingelbrecht, Essen (BE); Ruud Trion, Bergen op Zoom (NL)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/735,972

(22) Filed: Dec. 13, 2000

Related U.S. Application Data

(62) Division of application No. 09/245,252, filed on Feb. 5, 1999, now Pat. No. 6,211,327.

(51) Int. Cl.⁷ ............................ C08G 65/38; C08G 63/30
(52) U.S. Cl. ........................ 528/217; 528/212; 528/214; 528/501; 528/503; 264/50; 264/459
(58) Field of Search ................................. 528/217, 212, 528/214, 501, 503; 264/50, 459

(56) References Cited

U.S. PATENT DOCUMENTS 6,211,327 * 4/2001 Braat et al. ........................... 528/217

* cited by examiner

*Primary Examiner*—Duc Truong

(57) ABSTRACT

The invention relates to a novel process for the manufacture of very low molecular weight polyphenylene ether resin, typically within the intrinsic viscosity range of about 0.08 dl/g to about 0.16 dl/g as measured in chloroform at 25° C. The method preferably comprises 2,6-dimethylphenol as a monovalent phenol species.

The invention also relates to the polyphenylene ether resin made by the process as well as blends and articles containing the polyphenylene ether resin made by the process.

12 Claims, No Drawings

PROCESS FOR THE MANUFACTURE OF LOW MOLECULAR WEIGHT POLYPHENYLENE ETHER RESINS

CROSS-REFERENCE TO RELATED APPLICATIONS

This is a divisional of prior application Ser. No. 09/245,252 filed on Feb. 5, 1999 now U.S. Pat. No. 6,211,327 which is incorporated herein by reference.

FEDERALLY SPONSORED RESEARCH

Not Applicable

BACKGROUND OF THE INVENTION

1. Field of the Invention

The invention relates to a novel process for the manufacture of very low molecular weight polyphenylene ether resin, typically within the intrinsic viscosity range of about 0.08 dl/g to about 0.16 dl/g as measured in chloroform at 25° C.

The invention also relates to the polyphenylene ether resin made by the process as well as blends and articles containing the polyphenylene ether resin made by the process.

2. Brief Description of the Related Art

Polyphenylene ether resins (hereinafter "PPE") are commercially attractive materials because of their unique combination of physical, chemical, and electrical properties. Furthermore, the combination of PPE with other resins provides blends which result in additional overall properties such as chemical resistance, high strength, and high flow.

The processes most generally used to produce PPE involve the self-condensation of at least one monovalent phenol in the presence of an oxygen containing gas and a catalyst comprising a metal amine complex to produce resins typically within the intrinsic viscosity range of about 0.35 dl/g to about 0.65 dl/g as measured in chloroform at 25° C.

These processes are typically carried out in the presence of an organic solvent and the reaction is usually terminated by removal of the catalyst from the reaction mixture. The catalyst metal, after being converted into a soluble metal complex with the aid of a chelating agent, is removed from the polymer solution with standard extraction techniques, such as liquid-liquid extraction. The PPE polymer can be isolated in a variety of methods although generally by anti-solvent precipitation.

As new commercial applications are sought for PPE, a wider range of intrinsic viscosity resins, especially lower intrinsic viscosity resins, have been desired. As intrinsic viscosity decreases in PPE resins, the level of hydroxyl groups increases and the rheological properties change dramatically (lower viscosity as intrinsic viscosity decreases) as compared to current commercially available high molecular weight PPE produced by the methods previously described. The physical properties of PPE remain highly desirable and sought after in applications such as, for example, adhesives, sealants and gels based on SBC, SBR, or epoxies for automotive, housing, cabeling, membranes and electrical applications. Also, epoxy based composites for aerospace, automotive structural members and sporting equipment are desirable applications as are electrical laminates, and IC encapsulation materials based on epoxies and unsaturated polyesters. Friction materials and abrasives compounds based on phenolic are also sought after. PPE is also useful as an additive in various thermoplastic and thermoset materials including, e.g., polypropylene, polystyrene, ABS, polycarbonate, polyetherimide, polyamides, polyesters, and the like and also thermosetting resins such as, for example, epoxies, unsaturated polyesters, polyurethanes, allylic thermosets, bismaleimides, phenolic resins, and the like. Varying enhanced properties may be improved in different systems such as, for example, improved heat performance, flame retardancy improvement, decrease of electrical properties like $D_k$ and $D_f$, decrease in moisture absorption, increased creep resistance, thermal expansion reduction, chemical resistance to acids and bases, for various applications such as, for example, automotive and house hold and electrical goods.

It is therefore apparent that a need exists for the development of processes for the manufacture of very low molecular weight polyphenylene ether resin, typically within the intrinsic viscosity range of about 0.08 dl/g to about 0.16 dl/g as measured in chloroform at 25° C.

SUMMARY OF THE INVENTION

The needs discussed above have been generally satisfied by the discovery of a process for preparing PPE having an intrinsic viscosity within the range of about 0.08 dl/g to about 0.16 dl/g as measured in chloroform at 25° C. comprising oxidative coupling in a reaction solution at least one monovalent phenol species using an oxygen containing gas and a complex metal catalyst to produce a PPE having an intrinsic viscosity within the range of about 0.08 dl/g to about 0.16 dl/g as measured in chloroform at 25° C.; removing at least a portion of the complex metal catalyst with an aqueous containing solution; and isolating the PPE through devolatilization of the reaction solvent.

The description that follows provides further details regarding various embodiments of the invention.

DESCRIPTION OF THE DRAWINGS

Not applicable

DETAILED DESCRIPTION OF THE INVENTION

This invention provides for a process for the preparation of low molecular weight PPE, preferably having an intrinsic viscosity between about 0.08 dl/g and 0.16 dl/g, by oxidative coupling at least one monovalent phenol species, preferably at least a portion of which have substitution in at least the two ortho positions and hydrogen or halogen in the para position, using an oxygen containing gas and a complex metal-amine catalyst, preferably a copper (I)-amine catalyst, as the oxidizing agent and extracting at least a portion of the metal catalyst as a metal-organic acid salt with an aqueous containing solution, and isolating the PPE through devolatilization of the reaction solvent. In one embodiment, the process affords a PPE that has less than a 10% increase, preferably less than 5% increase in intrinsic viscosity after heating into the melt phase. In another embodiment, the process affords a PPE that has less than a 10% decrease, preferably less than 5% decrease, most preferably less than 3% decrease in intrinsic viscosity after an equilibration step following the oxidative coupling reaction.

The PPE employed in the present invention are known polymers comprising a plurality of structural units of the formula

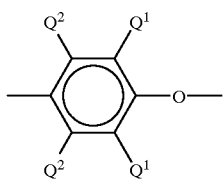

wherein each structural unit may be the same or different, and in each structural unit, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{1-4}$ alkyl, and each $Q^2$ is hydrogen.

Both homopolymer and copolymer PPE are included. The preferred homopolymers are those containing 2,6-dimethyl-1,4-phenylene ether units. Suitable copolymers include random copolymers containing such units in combination with (for example) 2,3,6-trimethyl-1,4-phenylene ether units. Also included are PPE containing moieties prepared by grafting vinyl monomers or polymers such as polystyrenes and elastomers, as well as coupled PPE in which coupling agents such as low molecular weight polycarbonates, quinones, heterocycles and formals undergo reaction in known manner with the hydroxy groups of two poly (phenylene ether) chains to produce a higher molecular weight polymer, provided a substantial proportion of free OH groups remains. Also included are PPE's containing a functional endgroup, obtained from reaction with a reactive compound having the functional endgroup.

The low molecular weight PPE generally have a number average molecular weight within the range of about 1250 to about 7000 and a weight average molecular weight within the range of about 2500 to about 15,000, as determined by gel permeation chromatography, with a preferred number average molecular weight within the range of about 1750 to about 4000 and a weight average molecular weight within the range of about 3500 to about 9,000, as determined by gel permeation chromatography. Alternatively, the intrinsic viscosity (hereinafter "I.V.") of the low molecular weight PPE is most often in the range of about 0.08–0.16 dl./g., preferably in the range of about 0.10–0.14 dl./g., as measured in chloroform at 25° C.

The PPE are typically prepared by the oxidative coupling of at least one monohydroxyaromatic compound such as 2,6-xylenol, 2,3,6-trimethylphenol, or mixtures of the foregoing. Catalyst systems are generally employed for such coupling and they typically contain at least one heavy metal compound such as a copper, manganese, or cobalt compound, usually in combination with various other materials.

It will be apparent to those skilled in the art from the foregoing that the PPE contemplated in the present invention include all those presently known, irrespective of variations in structural units or ancillary chemical features.

The polymerization of the phenolic monomer may be carried out by adding the phenolic monomer or monomers to a suitable reaction solvent and preferably, a copper-amine catalyst. It is preferred to carry out the polymerization in the presence of a cupric or cuprous salt-secondary amine catalyst such as, for example, cupric chloride and di-n-butylamine. The polymerizations are advantageously carried out in the presence of an inorganic alkali metal bromide or an alkaline earth metal bromide. The inorganic bromides may be used at a level of from about 0.1 mole to about 150 moles per 100 moles of phenolic monomer. These catalyst materials are described in U.S. Pat. No. 3,733,299 (Cooper et al.). Tetraalkylammonium salts may also be employed as promoters if desired. These promoters are disclosed in U.S. Pat. No. 3,988,297 (Bennett et al.).

The primary, secondary or tertiary amine component of the catalyst complex generally correspond to those disclosed in U.S. Pat. Nos. 3,306,874 and 3,306,875 (Hay). Illustrative members include aliphatic amines, including aliphatic mono- and di-amines, where the aliphatic group can be straight or branched chain hydrocarbon or cycloaliphatic. Preferred are aliphatic primary, secondary and tertiary monoamines and tertiary diamines. Especially preferred are mono-, di- and tri(lower) alkyl amines, the alkyl groups having from 1 to 6 carbon atoms. Typically, there can be used mono-, di- and tri-methyl, ethyl, n-propyl i-propyl, n-butyl substituted amines, mono- and di-cyclohexylamine, ethylmethyl amine, morpholine, N-(lower) alkyl cycloaliphatic amines, such as N-methylcyclohexylamine, N,N'-dialkylethylenediamines, the N,N'-dialkylpropanediamines, the N,N,N,'-trialkylpentanediamines, and the like. In addition, cyclic tertiary amines, such as pyridine, alpha-collidine, gamma picoline, and the like, can be used. Especially useful are N,N,N',N'-tetraalkylethylenediamines, butane-diamines, and the like.

Mixtures of such primary, secondary and tertiary amines may be used. A preferred mono alkyl amine is n-butyl amine; a preferred dialkyl amine is di-n-butyl amine; and a preferred trialkyl amine is triethylamine. A preferred cyclic tertiary amine is pyridine. The concentration of primary and secondary amine in the reaction mixture may vary within wide limits, but is desirably added in low concentrations. A preferred range of non-tertiary amines comprises from about 2.0 to about 25.0 moles per 100 moles of monovalent phenol. In the case of a tertiary amine, the preferred range is considerably broader, and comprises from about 0.2 to about 1500 moles per 100 moles of monovalent phenol. With tertiary amines, if water is not removed from the reaction mixture, it is preferred to use from about 500 to about 1500 moles of amine per 100 moles of phenol. If water is removed from the reaction, then only about 10 moles of tertiary amine, e.g., triethylamine or triethylamine, per 100 moles of phenol need be used as a lower limit. Even smaller amounts of tertiary diamines, such as N,N,N'N'-tetramethylbutanediamine can be used, down to as low as about 0.2 mole per 100 moles of phenol.

Typical examples of cuprous salts and cupric salts suitable for the process are shown in the Hay patents. These salts include, for example, cuprous chloride, cuprous bromide, cuprous sulfate, cuprous azide, cuprous tetramine sulfate, cuprous acetate, cuprous butyrate, cuprous toluate, cupric chloride, cupric bromide, cupric sulfate, cupric azide, cupric tetramine sulfate, cupric acetate, cupric butyrate, cupric toluate, and the like. Preferred cuprous and cupric salts include the halides, alkanoates or sulfates, e.g., cuprous bromide and cuprous chloride, cupric bromide and cupric chloride, cupric sulfate, cupric fluoride, cuprous acetate and cupric acetate. With primary and secondary amines, the concentration of the copper salts is desirable maintained low and preferably varies from about 0.2 to 2.5 moles per 100 moles of monovalent phenol. With tertiary amines, the copper salt is preferable used in an amount providing from about 0.2 to about 15 moles per 100 moles of the monovalent phenol.

Cupric halides are generally preferred over cuprous halides for the preparation of the copper amine catalyst because of their lower cost. The use of the copper (I) species also greatly increases the rate of oxygen utilization in the early stages of the polymerization reaction and the lower oxygen concentration in the head space of the reactor helps in reducing the risk of fire or explosion in the reactor. A process for the preparation and use of suitable copper-amine catalysts is in U.S. Pat. No. 3,900,445 (Cooper et al.).

A faster initial reaction rate with the copper (I) based catalyst also results in less accumulation of unreacted monomer and a reduction in the amount of undesirable tetramethyldiphenylquinone produced. The tetramethyldiphenylquinone, a backward dimer, is believed to incorporate into the PPE through equilibration reactions. The equilibration reactions lead to a drop in the intrinsic viscosity of the PPE due to the decrease in molecular weight of the PPE from the incorporation of the dimer. Minimization of the tetramethyldiphenylquinone during the oxidation coupling is desirable so as to avoid the drop in molecular weight and the accompanying difficulties in having to build to a higher than desired molecular weight to offset the loss during equilibration of the backward dimer. It was unexpectedly found that the present invention affords a process in which the PPE in the reaction mixture shows less than a 10% drop, preferably less than a 5% drop, most preferably less than a 3% drop in I.V. during an equilibration step after the oxidative polymerization of the phenolic monomers.

The polymerization reaction is preferably performed in a solvent. Suitable solvents are disclosed in the above-noted Hay patents. Aromatic solvents such as benzene, toluene, ethylbezene, xylene, and o-dichlorobenzene are especially preferred, although tetrachloromethane, trichloromethane, dichloromethane, 1,2-dichloroethane and trichloroethylene may also be used. The weight ratio between solvent and monomer is normally in the range from 1:1 to 20:1, ie. up to a maximum 20-fold excess of solvent. The ratio between solvent and monomer is preferably in the range from 1:1 to 10:1 by weight.

One unexpected advantage of the present process to make low intrinsic viscosity PPE is that a higher solids loading is possible as compared to processes that make higher (i.e. >0.28 I.V.) PPE. Without the increased solution viscosity build that concomitantly accompanies high molecular weight polymer, the final solids concentration can be increased by at least 20%, with increases of 30% or more possible. Thus, the present process affords a method for increased reactor utilization and productivity without increasing the size or number of the reactor vessels.

The process and reaction conditions for the polymerization, such as reaction time, temperature, oxygen flow rate and the like are modified based on the exact target molecular weight desired. The endpoint of the polymerization is conveniently determined with an in-line viscosity meter. Although other methods such as making molecular weight measurements, running to a predetermined reaction time, controlling to a specified endgroup concentration, or the oxygen concentration in solution may also be utilized.

The temperature to carry out the polymerization stage of the invention generally ranges from about 0° C. to about 95° C. More preferably, the temperature range is from about 35° C. to about 45° C. with the higher reaction temperature near the end of reaction. At substantially higher temperatures, side reactions can occur leading to reaction by-products and at temperatures substantially lower, ice crystals form in the solution.

Many diverse extractants or chelating agents may be used in the practice of the invention to complex with the catalyst after the end of the polymerization reaction. For example, sulfuric acid, acetic acid, ammonium salts, bisulfate salts and various chelating agents may be used. When these materials are added to a PPE reaction solution, the copper-amine catalyst becomes poisoned and further oxidation does not take place. Many different materials may be used but it is preferred to employ those chelating agents that are disclosed in U.S. Pat. No. 3,838,102 (Bennett et al.).

The useful chelating agents include polyfunctional carboxylic acid containing compounds such as, for example, sodium potassium tartrate, nitrilotriacetic acid (NTA), citric acid, glycine and especially preferably they will be selected from polyalkylenepolyamine polycarboxylic acids, aminopolycarboxylic acids, aminocarboxylic acids, aminopolycarboxylic acids, aminocarboxylic acids, polycarboxylic acids and their alkali metal, alkaline earth metal or mixed alkali metal-alkaline earth metal salts. The preferred agents include ethylenediaminetetraacetic acid (EDTA), hydroxyethylenediaminetriacetic acid, diethylenetriaminepentaacetic acid and their salts. Especially preferred are ethylenediaminotetraacetic acid or a mono-, di-, tri- and tetrasodium salt thereof and the resulting copper complex can be referred to as a copper carboxylate complex.

The chelated metallic catalyst component can be extracted with the water produced in the polymerization reaction by through the use of a liquid/liquid centrifuge. The preferred extraction liquid for use in the process of the invention is an aqueous solution of lower alkanol, i.e., a mixture of water and an alkanol having from 1 to about 4 carbon atoms. Generally from about 1% to about 80% by volume of an alkanol or glycol may be employed. These ratios may vary from about 0.01:1 to about 10:1 parts by volume of aqueous liquid extractant to discrete organic phase.

The reaction media generally comprises an aqueous environment. Anti-solvents can also be utilized in combination with the aqueous media to help drive the precipitation of the copper (I) species. The selection of an appropriate anti-solvent is based partially on the solubility co-efficient of the copper (I) species that is being precipitated. The halides are highly insoluble in water, log $K_{[sp]}$ values at 25° C. are −4.49, −8.23 and −11.96 for CuCl, CuBr and CuI, respectively. Solubility in water is increased by the presence of excess of halide ions due to the formation of, e.g., $CuCl_2$, $CUCl_3$, and $CuCl_4$ and by other complexing species. Non-limiting examples of anti-solvents would comprise low molecular weight alkyl and aromatic hydrocarbons, ketones, alcohols and the like which in themselves would have some solubility in the aqueous solution. One skilled in the art would be able to select an appropriate type and amount of anti-solvent, if any was utilized.

One unexpected advantage of the present invention to make low molecular weight PPE (i.e. PPE having an I.V. in the range of about 0.08–0.16 dl./g.) is the reduction in I.V. variation and molecular weight of the PPE after the end of reaction. In the processes of the prior art to make higher intrinsic viscosity resin, i.e. I.V.>0.28 dl/g., after the end of reaction the PPE is held at elevated temperature, typically between about 45° C. to about 70° C. for between about 45 to 90 minutes, while the catalyst chelating species as described above is added and allowed to react. During this equilibration process, the previously described backward dimer phenols that are reaction by-products of the oxidation process incorporate into the polymer backbone resulting in a decrease in the molecular weight and I.V. of the PPE. To illustrate this decrease, a PPE targeted to have an I.V. of 0.48 dl/g at the end of reaction will drop to an I.V. of about 0.38 dl/g after equilibration. Conversely, in the present invention, a PPE having a target end of run I.V. of about 0.113 dl/g, after equilibration will have an I.V. of about 0.115 dl/g. It should be apparent that the present invention affords a method to prepare a PPE that has less than about a 10% drop, preferably less than about a 5% drop, and most preferably less than about a 3% drop in I.V. during equilibration after the end of reaction.

After removal of the catalyst, the PPE containing solution is concentrated to a higher solids level as part of the isolation of the PPE. Precipitation using standard non-solvent techniques typical for PPE having I.V.'s greater than 0.28 dl/g are not generally useful for isolation of low molecular weight PPE due to the small PPE particle size and friability of the particles. Very low yields are obtained with undesirable fractionation of oligomeric species. A total isolation process is preferred for isolating the PPE. As part of the total isolation, a portion of the solvent is preferably removed in order to reduce the solvent load on the total isolation equipment.

Concentration of the PPE containing solution is accomplished by reducing the pressure in a solvent flash vessel while preferably increasing the temperature of the PPE containing solution. Pressures of about 35 to 50 bar are desirable with solution temperatures increased to at least 200° C., preferably of at least 230° C. A solids level of PPE of at least 55%, preferably of at least 65% or higher is desirable.

The isolation of the PPE is typically carried out in a devolatilizing extruder although other methods involving spray drying, wiped film evaporators, flake evaporators, and flash vessels with melt pumps, including various combinations involving these methods are also useful and in some instances preferred. As previously described, total isolation is preferably from the viewpoint that oligomeric species are not removed to the same degree as with precipitation. Likewise, isolation yields are extremely high and are near quantitative. These techniques require however that the catalyst removal be completed in the prior process steps as any catalyst remaining in solution will necessarily be isolated in the PPE.

Devolatilizing extruders and processes are known in the art and typically involve a twin-screw extruder equipped with multiple venting sections for solvent removal. In the practice of the present invention, the preheated concentrated solution containing the PPE is fed into the devolatilizing extruder and maintained at a temperature less than about 275° C., and preferably less than about 250° C., and most preferably between about 185–220° C. with pressures in the vacuum vent of less than about 1 bar. The resultant solvent level is reduced to less than about 1200 ppm, preferably less than about 600 ppm, and most preferably less than about 400 ppm. Furthermore, it was unexpected that temperatures as low as less than 250° C. and preferably between about 185–220° C. would be useful and preferred as current PPE having an I.V. of >0.28 dl/g generally require a temperature of 300° C. or higher in similar total isolation processes.

Another unexpected result obtained through the use of a devolatilizing extruder was the extremely high yield of PPE achieved in the process. For example, a PPE yield of over 99% was obtained even for PPE having a low I.V. whereas in the precipitation process known in the art, the yield of similar low I.V. PPE was less than 90%. Thus, the present process comprising a devolatilizing extruder affords a method to prepare low molecular weight polyphenylene ether resin, typically within the intrinsic viscosity range of about 0.08 dl/g to about 0.16 dl/g, in a yield of over 90%, preferably over 95%, more preferably over 98% and most preferably over 99%, based upon the amount of monovalent phenol utilized in the oxidative coupling.

When using a devolatilization extruder for the total isolation of the PPE, it was found that traditional underwater or water spray cooling of strands of extrudate followed by chopping the extrudate into pellets gave unacceptable results presumably due to the low melt strength and inherent brittle nature of low molecular weight PPE. It was found that special pelletization techniques can overcome these difficulties. Useful techniques include die-face pelletization, including underwater pelletization and flaking, declining angle strand pelletization using water spraying, and vibration drop pelletization with underwater pelletization especially suitable.

It was unexpectedly found that underwater pelletization resulted in a significantly lower color in the PPE as compared to the standard stranding with water/air cooling followed by pelletization techniques. Yellowness index (YI) numbers of less than 30, and even less than 25 are achievable as compared to YI>50 achieved with the standard stranding technique. It should be apparent that the present process affords a method of preparing a PPE with a YI of less than about 30, preferably less than about 25.

Another unexpected benefit of underwater pelletization of PPE, especially low I.V. PPE, is that very low (less than about 3% by weight) fines, defined as pellets (i.e. particles) of less than 850 microns in size, could be obtained. It should be clear that the present invention includes a method to reduce the number of fines having a particle size less than about 850 micron in polyphenylene ether wherein the method comprises underwater pelletization of the polyphenylene ether resin. A preferred embodiment includes a method to reduce the number of fines having a particle size less than about 850 micron to less than about 3%, preferably less than about 1.5% by weight based on the total weight of the pellets.

The collected PPE pellets can be dried using techniques standard in the art including centrifugal dryers, batch or continuous oven dryers, fluid beds, and the like. Determination of an appropriate set of conditions can be readily determined by one of skill in the art without undue experimentation.

All patents cited by reference are incorporated herein by reference.

In order that those skilled in the art will be better able to practice the invention, the following examples are given by way of illustration and not by way of limitation.

EXAMPLES

Polymerization Reaction

A typical laboratory reaction recipe and reaction conditions are indicated below:

The catalyst solution can be prepared by stirring 0.41 g of cuprous bromide and 10.9 g of di-n-butyl amine in 100 ml of toluene. The catalyst is transferred to a one liter stirred glass reactor equipped with an internal cooling coil and inlet tubes for oxygen and monomer. A rapid stream of oxygen is introduced near the bottom of the reactor and a solution of 70 g of 2,6-xylenol in 100 ml of toluene is added through a metering pump, over a period of fifteen minutes, to the rapidly stirred solution. The temperature is maintained initially at about 40° C. to about 45° C./48° C. towards the end of the run by circulating water from a constant temperature bath through the cooling coil. Molecular weight build is continuously monitored with a typical reaction time to target I.V. of about 100–107 minutes.

Although the conditions are for a laboratory scale reaction they in general scaleable to commercial processes carried out in commercial equipment without undue burden by one of skill in the art.

Equilibration

In the glass reactor vessel, the copper catalyst was complexed by the addition of a complexant like nitrilotriacetic acid (NTA) or other copper complexing agent in order to solubilize it in the aqueous liquid phase.

| | |
|---|---|
| Mixing time: | ca. 70 min. |
| Temperature: | ca. 55° C. |

Removal of Complexed Catalyst

Typical conditions for a liquid/liquid centrifuge on a commercial scale are as indicated below.

| | |
|---|---|
| PPE solution feed rate to the $1^{st}$ L/L centrifuge: | 10 m³/hr |
| water feed rate to the $1^{st}$ L/L centrifuge: | 100–200 l/hr |
| PPE solution feed rate to the $2^{nd}$ L/L centrifuge: | 0.5–0.8 m³/hr |
| water feed rate to the $2^{nd}$ L/L centrifuge | 100 l/hr |

Typical residual water and copper contents achieved after the $1^{st}$ centrifuge are water as low as 1500 ppm and copper as low as 0.2 ppm. Surprisingly it was found that the feed can be recirculated constantly over the centrifuge, without negative effect on the ease of separation or emulsion formation tendency, hence achieving multiple extraction steps. In the feed to the $2^{nd}$ centrifuge only water, without additional NTA is added.

Preconcentration

Typical conditions for a commercial scale are as follows. The PPE containing solution is preheated to a temperature of at least 240° C. a pressure of ca. 40 bar. The solution is flashed to low pressure in a flash vessel a PPE solids content of at least about 65%. The high solids level is desirable to reduce the solvent load to the total isolation equipment that would have been present without preconcentration. Typical conditions are tabulated below:

| | |
|---|---|
| P before the flash vessel: | 40 bar |
| T before the flash vessel: | 245–260° C. |
| Feedrate to the flash tank: | 0.7–.87 ton/hr |
| T after the flash vessel | 114–126° C. |

Total Isolation

The isolation is preferably carried out in a devolatilizing extruder. The preferred devolatilizing extruder is a co-rotating twin screw extruder with a backfeed capability. Multiple devolatilizing venting sections are preferred to achieve low volatiles content.

Typical settings are indicated in the table below.

| | |
|---|---|
| T zone 1 | ca. 200° C. |
| T zone 2 | ca. 200° C. |
| T zone 3 | ca. 200° C. |
| T zone 4 | ca. 195–200° C. |
| T zone 5 | ca. 195–200° C. |
| T zone 6 | ca. 200° C. |
| T zone 7 | ca. 200° C. |
| T zone 8 | ca. 200° C. |
| T zone 9 | ca. 200° C. |
| P back vent | ca. 0.8 bar |
| P $1^{st}$ vacuum vent | ca. 0.8 bar |
| P $2^{nd}$ vacuum vent | ca. 0.7 bar |
| P $3^{rd}$ vacuum vent | ca. 0.72–0.75 bar |
| Screw rpm | ca. 294 |
| Extruder Torque | ca. 30–38% |
| Extruder motor Amp | ca. 85–106 |

It was unexpected that such very low temperatures could be used while still maintaining excellent low residual solvent levels in the end product. PPE grades known in the art and having I.V.'s of at least 0.28 dl/g are isolated at 300° C. or above under similar conditions.

Other configurations and modifications can be used as well, like different size and number of venting ports, other screw design, sequence of feed and venting sections. Also the preheated feed solution can be added in any solvent concentration with flashing either partly or totally in the devolatizing extruder.

Pelletization

The low melt strength of the low molecular weight PPE's requires special pelletization techniques compared to normal IV grade PPE materials. The table below shows typical settings for the underwater pelletizer:

| | |
|---|---|
| Product throughput: | ca. 240 kg/hr |
| Melt pump feed pressure: | ca. 6 bar |
| Melt pump product pressure: | ca. 95–100 bar |
| Die temperature: | ca. 300° C. |
| Water addition rate: | ca. 10 m³/hr |
| Rotating knife rpm: | ca. 3600 |
| Water temperature: | ca. 90° C. |
| Centrifugal dryer rpm: | ca. 450 |

The pelletized low molecular weight PPE, which is inherently very brittle, unexpectedly had a low content of fines. Fines levels of less than 3% by weight below 850 micron, preferably less than 2% by weight, and most preferably less than about 1.1% by weight can be achieved by the process. Modifications are achievable without undue experimentation of the die design, rotating knife speed, temperature and throughput, the particle size can be readily controlled to desired values.

In order to further highlight some of the unexpected results obtained in the present process, the following tables compare various properties and characteristics obtained for low molecular weight PPE as compared to a PPE having an I.V. of 0.48 dl/g prepared as described by methods known in the art.

The table below compares two batches of low molecular weight with an end of reaction I.V. of about 0.11 dl/g to a batch of high molecular weight PPE having an end of reaction I.V. of about 0.48 dl/g. After equilibration, the I.V. of the high molecular weight has dropped by approximately 20% whereas the low molecular weight PPE batches have remained constant within experimental error of the test method. After the PPE samples had been treated to thermal processing in the melt, the low molecular weight PPE samples again remain fairly stable in I.V. with less than 5% increase in I.V. Conversely, the high molecular weight PPE has an increase in I.V. from about 0.38 after equilibration to about 0.485 after melt processing, an increase of about 25%. It was unexpected that the low molecular weight PPE prepared in the present process would have an I.V. that varied less than about 5% throughout equilibration and thermal processing (heating into the melt for about 0.2 minutes to about 20 minutes, ca. 200° C. for low molecular weight and ca. 300° C. for high molecular weight).

| PPE Grade | I. V. at end of reaction (dl/g) | I. V. after equilibration (dl/g) | I. V. after thermal processing (dl/g) |
|---|---|---|---|
| Low molecular weight PPE batch 1 | 0.113 | 0.115 | 0.116–0.122 |
| Low molecular weight PPE batch 2 | 0.114 | 0.116 | 0.116–0.122 |
| High molecular weight PPE | 0.48 | 0.38 | 0.485 |

It should be clear from the data in the above table that the present invention include a method to prepare a low molecular weight PPE that has less than about 3% change in I.V. through equilibration. It should also be clear that the present invention also includes a method to prepare a low molecular weight PPE that has less than about 5% change in I.V. after equilibration and through thermal processing. Furthermore, it should also be clear that the present invention includes a PPE that has less than about 3% change in I.V. through equilibration. Also it should be clear that the present process also includes a polyphenylene ether resin having less than about a 10% change in intrinsic viscosity after an equilibration step following the oxidative coupling and after a thermal treatment at 200° C. for about 0.2 minutes to about 20 minutes.

The table below compares the level of copper remaining after the catalyst extraction steps. As can be seen from these data, the low molecular weight PPE has less than half the amount of residual copper remaining in the final isolated product. It was unexpected that the I.V. of the PPE would have an effect for improving the catalyst removal.

| PPE Grade | ppm Cu PPO solution after 1st centrifuge | ppm Cu final product |
|---|---|---|
| Low molecular weight PPE (0.11 dl/g) | 0.2–2 | 1–3 |
| High molecular weight PPE (0.48 dl/g) | ca. 5 | ca. 8 |

The table below compares the devolatilization extruder temperature range and residual toluene level remaining in the final isolated PPE. It was unexpected that the extruder could be operated at a lower temperature range and obtain residual solvent levels that are as good or better than obtained with higher temperatures for a higher (0.48 I.V.) molecular weight PPE. It should be noted that the extruder cannot be operated at the lower temperature range with 0.48 I.V. PPE without exceeding the torque rating of the machine.

| PPE Grade | Extruder zone Temperature range | ppm toluene in final product |
|---|---|---|
| Low molecular weight PPE (0.11 dl/g) | 195–200° C. | 260–450 |
| High molecular weight PPE (0.48 dl/g) | 245–300° C. | ca. 300–500 |

The following table compares the level of dibutylamine (DBA) incorporated in the low molecular weight PPE of the present invention as compared to the level incorporated into high molecular weight (0.48 I.V.) PPE. It was unexpected that such low levels would remain in the low molecular weight PPE. It should be clear from these data that the present process affords a more cost effective and environmentally friendly PPE process as a larger proportion of the dibutylamine remains with the solvent stream and can be recovered and recycled.

| PPE Grade | DBA content of final product |
|---|---|
| Low molecular weight PPE (0.11 dl/g) | 0.15–0.28% |
| High molecular weight PPE (0.48 dl/g) | 0.9–1.0% |

Thus, the present invention includes a process to make low I.V. PPE having an incorporated amine level of less than about 0.3% by weight based on the weight of the PPE.

These and other embodiments should be apparent from the disclosure contained herein.

What is claimed:

1. A method to reduce the yellowness index of polyphenylene ether resin, wherein the method comprises oxidative coupling in a reaction solution at least one monovalent phenol species using an oxygen containing gas and a complex metal catalyst to produce a polyphenylene ether resin having an intrinsic viscosity within the range of about 0.08 dl/g to about 0.16 dl/g as measured in chloroform at 25° C.; recovering the complex metal catalyst with an aqueous solution and isolating the polyphenylene ether resin through devolatilization of the reaction solvent, wherein the devolatilization is accomplished at least in part with a devolatilization extruder maintained at a temperature less than about 275° C.

2. The method of claim 1 further comprising underwater pelletization of the polyphenylene ether resin.

3. The method of claim 1 wherein the yellowness index of the polyphenylene ether resin is less than about 30.

4. The method of claim 1 wherein the monovalent phenol species comprises 2,6-dimethylphenol.

5. A polyphenylene ether resin prepared according to the method of claim 3.

6. The method of claim 1, further comprising underwater pelletizing the polyphenylene ether, wherein the polyphenylene ether after pelletizing has less than about 3% by weight of particles having a particle size less than about 850 microns.

7. The method of claim 1 wherein recovering the complex metal catalyst comprises equilibrating a metal chelating agent with the complex metal catalyst.

8. The method of claim 1 further comprising equilibrating the polyphenylene ether resin with a backward dimer.

9. The method of claim 8 wherein equilibrating the polyphenylene ether with the backward dimer changes the intrinsic viscosity of the polyphenylene ether less than about 10%.

10. The method of claim 1 wherein the polyphenylene ether resin has an incorporated amine content of less than about 0.3% by weight based on the weight of the polyphenylene ether resin.

11. The method of claim 1 wherein isolating the polyphenylene ether resin increases the intrinsic viscosity of the polyphenylene ether resin less than 5%.

12. The method of claim 1 wherein the polyphenylene ether resin has less than about a 10% change in intrinsic viscosity after an equilibration step and after a thermal treatment at 185° C.–220° C. for about 0.2 minutes to about 20 minutes.

* * * * *

UNITED STATES PATENT AND TRADEMARK OFFICE
CERTIFICATE OF CORRECTION

PATENT NO. : 6,300,461 B1
DATED : October 9, 2001
INVENTOR(S) : Adrianus J. F. M. Braat, Hugh Ingelbrecht and Ruud Trion It is certified that error appears in the above-identified patent and that said Letters Patent is hereby corrected as shown below:

<u>Title page,</u>
Item [56], References Cited, U.S. PATENT DOCUMENTS, insert -- 4,097,556  6/1978   Toyama et al.
   4,283,511  8/1981   Ueno et al.
   4,287,321  9/1981   Olander
   4,315,086  2/1982   Uneo et al.
   4,338,410  7/1982   Ueno et al.
   4,460,764  7/1984   Reffert et al.
   4,482,705  11/1984  Hambrecht et al.
   4,618,668  10/1986  Muench et al.
   4,654,405  3/1987   Jalbert et al.
   4,654,418  3/1987   Berger et al.
   4,696,996  3/1987   Brandt et al.
   4,732,937  3/1988   Sybert
   4,732,938  3/1988   Grant et al.
   4,743,661  5/1988   Mitulla et al.
   4,746,708  5/1988   Sybert
   4,751,268  6/1988   Taubitz et al.
   4,797,453  1/1989   Taubitz et al.
   4,808,601  2/1989   Kadin
   4,808,671  2/1989   Sivavec
   4,808,674  2/1989   Johnson et al.
   4,873,286  10/1989  Gallucci et al.
   5,153,266  10/1992  Muehlbach et al.
   5,159,027  10/1992  Kanayama et al.
   5,171,825  12/1992  Hedtmann-Rein et al.
   5,177,156  1/1993   Aritomi et al.
   5,245,105  9/1993   Lin et al.
   5,348,569  9/1994   Bikson et al.
   5,360,866  11/1994  Arashiro et al.
   5,391,603  2/1995   Wessel et al.
   5,621,066  4/1997   Edema --

UNITED STATES PATENT AND TRADEMARK OFFICE
CERTIFICATE OF CORRECTION

PATENT NO.    : 6,300,461 B1
DATED         : October 9, 2001
INVENTOR(S)   : Adrianus J. F. M. Braat, Hugh Ingelbrecht and Ruud Trion It is certified that error appears in the above-identified patent and that said Letters Patent is hereby corrected as shown below:

References Cited, insert
-- FOREIGN PATENT DOCUMENTS,

| | | |
|---|---|---|
| 0 103275    | 4/1986  | (EP) |
| 0 301 404 B1 | 3/1988  | (EP) |
| 285970      | 3/1988  | (EP) |
| 0 226 002 B1 | 3/1989  | (EP) |
| 0 207 390 B1 | 9/1989  | (EP) |
| 0 207 387 B1 | 5/1990  | (EP) |
| 0 262 528 B1 | 1/1991  | (EP) |
| 0 314 004 B1 | 5/1992  | (EP) |
| 0 338 425 B1 | 3/1993  | (EP) |
| 0 548 683 A1 | 6/1993  | (EP) |
| 0 417 545 B1 | 6/1994  | (EP) |
| 0 402 721 B1 | 11/1994 | (EP) |
| 0 512 283 B1 | 11/1996 | (EP) |
| 0 510 391 B1 | 1/1997  | (EP) |
| 5279472 A   | 10/1993 | (EP) -- |

Signed and Sealed this

Twenty-fourth Day of September, 2002

*Attest:*

JAMES E. ROGAN
*Director of the United States Patent and Trademark Office*

*Attesting Officer*